(12) United States Patent
Ito et al.

(10) Patent No.: US 12,665,468 B2
(45) Date of Patent: Jun. 23, 2026

(54) DRIVE DEVICE

(71) Applicant: TOYOTA JIDOSHA KABUSHIKI KAISHA, Toyota (JP)

(72) Inventors: Eiji Ito, Toyota (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 18/436,463

(22) Filed: Feb. 8, 2024

(65) Prior Publication Data

US 2024/0421658 A1      Dec. 19, 2024

(30) Foreign Application Priority Data

Jun. 14, 2023      (JP) ................................. 2023-097597

(51) Int. Cl.
H02K 7/11 (2006.01)
F16H 57/04 (2010.01)
H02K 7/116 (2006.01)

(52) U.S. Cl.
CPC ....... H02K 7/1163 (2013.01); F16H 57/0436 (2013.01); F16H 57/0472 (2013.01)

(58) Field of Classification Search
CPC .............. F16H 57/029; F16H 57/0495; F16H 57/0476; F16H 57/038; F16H 57/0424
See application file for complete search history.

(56) References Cited

U.S. PATENT DOCUMENTS

| | | | |
|---|---|---|---|
| 6,158,303 A | 12/2000 | Shiraishi et al. | |
| 6,201,365 B1 * | 3/2001 | Hara ......................... | B60L 1/02 |
| | | | 903/952 |
| 10,272,767 B1 * | 4/2019 | Tang ......................... | F01P 5/10 |
| 2006/0213303 A1 * | 9/2006 | Shigemi ................. | F16J 15/324 |
| | | | 277/354 |
| 2022/0376588 A1 * | 11/2022 | Nakamura .......... | F16H 57/0417 |

FOREIGN PATENT DOCUMENTS

| | | |
|---|---|---|
| JP | S63-061090 A | 3/1988 |
| JP | H09-118142 A | 5/1997 |
| JP | H10-272944 A | 10/1998 |
| JP | 2004-050886 A | 2/2004 |
| JP | 2017-032021 A | 2/2017 |

OTHER PUBLICATIONS

U.S. Appl. No. 18/540,882, filed Dec. 15, 2023.

* cited by examiner

*Primary Examiner* — Leda T Pham
(74) *Attorney, Agent, or Firm* — SoraIP, Inc.

(57) ABSTRACT

A drive device mounted on a vehicle, the drive device comprising: an electric motor housed in the electric motor chamber; a first shaft arranged parallel to or coaxial with a rotor shaft of the electric motor; a counter gear for transmitting rotation of the rotor shaft to the first shaft; a second shaft for rotating wheels of the vehicle; a hypoid gear for transmitting rotation of the first shaft to the second shaft; an oil seal for sealing a gap between the first shaft and the case; a first lubricating oil housed in the electric motor chamber and the counter gear chamber; and a second lubricating oil housed in the hypoid gear chamber.

6 Claims, 3 Drawing Sheets

DRIVE DEVICE

CROSS-REFERENCE TO RELATED APPLICATION

This application claims priority to Japanese Patent Application No. 2023-097597 filed on Jun. 14, 2023, incorporated herein by reference in its entirety.

BACKGROUND

1. Technical Field

A technique disclosed in the present specification relates to a drive device.

2. Description of Related Art

A drive device disclosed in Japanese Unexamined Patent Application Publication No. 2004-050886 (JP 2004-050886 A) includes an electric motor, a pinion shaft, a wheel shaft, a counter gear, and a hypoid gear. The pinion shaft is disposed parallel to a rotor shaft of the electric motor. The counter gear transmits the rotation of the rotor shaft to the pinion shaft. The wheel shaft extends along a different direction than the rotor shaft. The hypoid gear transmits the rotation of the pinion shaft to the wheel shaft. The electric motor is housed in an electric motor chamber. The counter gear and the hypoid gear are housed in a common gear chamber. Lubricating oil is stored in the gear chamber. A portion between the gear chamber and the electric motor chamber is isolated by a sealing material or the like.

SUMMARY

The type of lubricating oil suitable for a counter gear and the type of lubricating oil suitable for a hypoid gear are different. In JP 2004-050886 A, since the same lubricating oil is used for the counter gear and the hypoid gear, the performance of one of the counter gear and the hypoid gear cannot be sufficiently utilized. In the present specification, a technique of appropriately operating both the counter gear and the hypoid gear is proposed.

A drive device disclosed in the present specification is mounted on a vehicle. The drive device includes: a case including an electric motor chamber, a counter gear chamber, and a hypoid gear chamber; an electric motor housed in the electric motor chamber; a first shaft that is disposed parallel to or coaxial with a rotor shaft of the electric motor and extends from the counter gear chamber to the hypoid gear chamber; a counter gear that is housed in the counter gear chamber and transmits rotation of the rotor shaft to the first shaft; a second shaft that extends from the hypoid gear chamber to an outside of the case and rotates a wheel of the vehicle; a hypoid gear that is housed in the hypoid gear chamber and transmits rotation of the first shaft to the second shaft; an oil seal that seals a gap between the first shaft and the case; a first lubricating oil stored in the electric motor chamber and the counter gear chamber; and a second lubricating oil stored in the hypoid gear chamber.

In this drive device, the counter gear chamber is isolated from the hypoid gear chamber by an oil seal. Therefore, different lubricating oils can be used in the counter gear chamber and the hypoid gear chamber. Therefore, both the counter gear and the hypoid gear can be operated efficiently. In addition, a common first lubricating oil is used for the electric motor chamber and the counter gear chamber. Even when the common lubricating oil is used for the electric motor and the counter gear, they can operate efficiently. In addition, by using the common lubricating oil for the electric motor chamber and the counter gear chamber, an increase in the type of the lubricating oil used in the drive device can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a cross-sectional view of the left drive system 90 taken along the left-right direction; and.

DETAILED DESCRIPTION OF EMBODIMENTS

Additional features of the drive device disclosed herein are listed below.

The viscosity of the first lubricating oil may be lower than the viscosity of the second lubricating oil.

According to this configuration, it is possible to suppress the oil film from being broken on the tooth surface of the hypoid gear by the second lubricating oil having a high viscosity. In addition, the rotor and the counter gear can be rotated with low loss by the first lubricating oil having low viscosity.

The drive device may further include an oil pump for circulating the first lubricating oil between the electric motor chamber and the counter gear chamber.

According to this configuration, the electric motor and the counter gear can be cooled.

Figure 1:
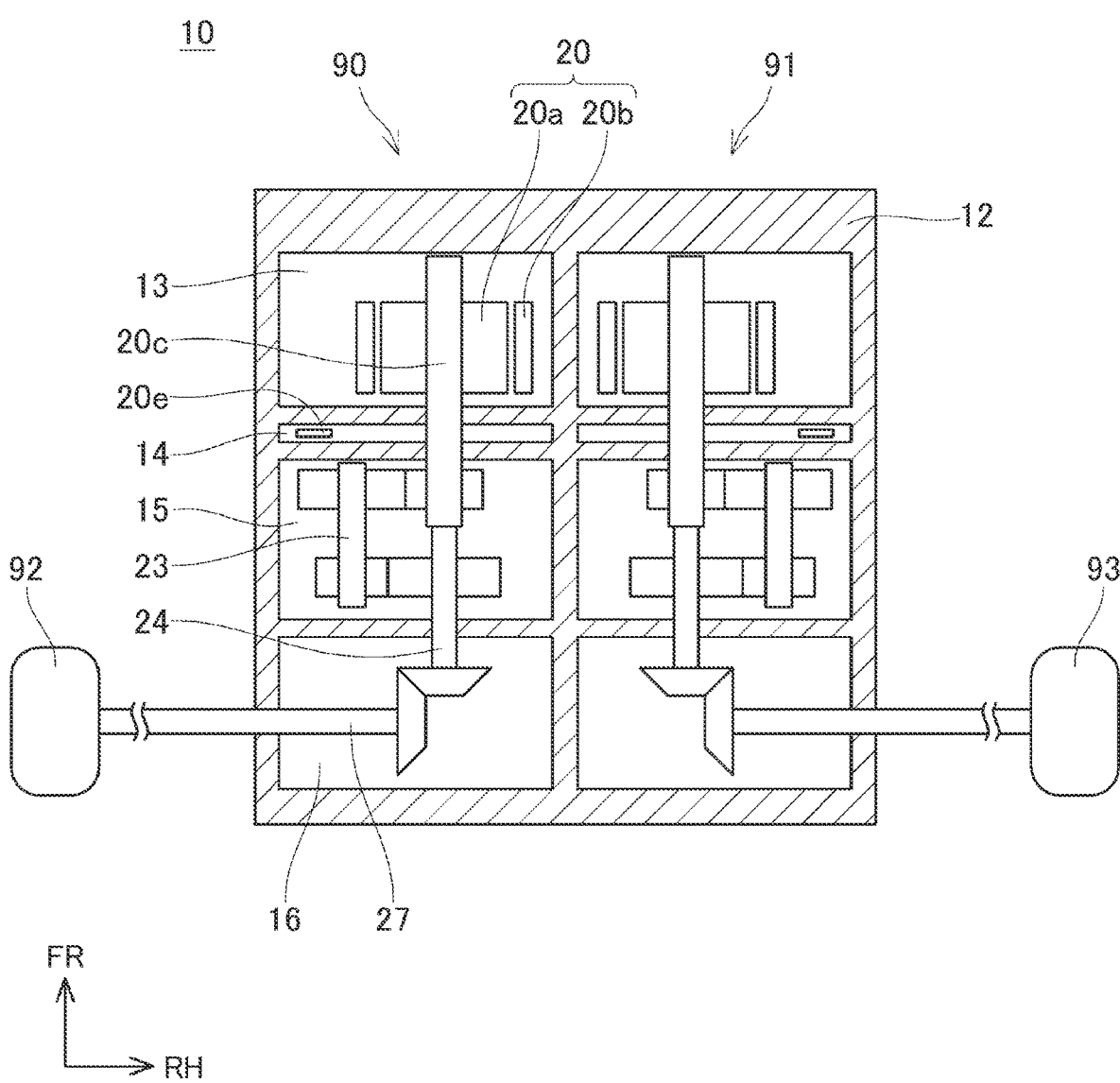
FIG. 1 is a cross-sectional view of a drive device along the left-right direction.

The drive device 10 of the embodiment shown in FIG. 1 is mounted on a electrified vehicle. Note that in FIG. 1, the arrow FR indicates the vehicle front direction, and the arrow RH indicates the vehicle right direction. The drive device 10 includes a case 12. A left drive system 90 and a right drive system 91 are provided inside the case 12. The left drive system 90 drives the left rear wheel 92 of electrified vehicle. The right drive system 91 drives the right rear wheel 93 of electrified vehicle. Since the left drive system 90 and the right drive system 91 are symmetrical, the left drive system 90 will be described below.

Inside the case 12, a left electric motor chamber 13, a left terminal block chamber 14, a left counter gear chamber 15, and a left hypoid gear chamber 16 are provided. The left terminal block chamber 14 is disposed behind the left electric motor chamber 13. The left counter gear chamber 15 is disposed behind the left terminal block chamber 14. The left hypoid gear chamber 16 is located behind the left counter gear chamber 15. An electric motor 20 is accommodated in the left electric motor chamber 13. A terminal block 20c is accommodated in the left terminal block chamber 14. The terminal block 20e includes a terminal for supplying electric power to the electric motor 20. A gear set constituting the counter gear is accommodated in the left counter gear chamber 15. A gear set constituting the hypoid gear is accommodated in the left hypoid gear chamber 16. The left drive system 90 is constituted by the electric motor 20, a gear set in the left counter gear chamber 15, a gear set in the left hypoid gear chamber 16, and the like.

Figure 2:
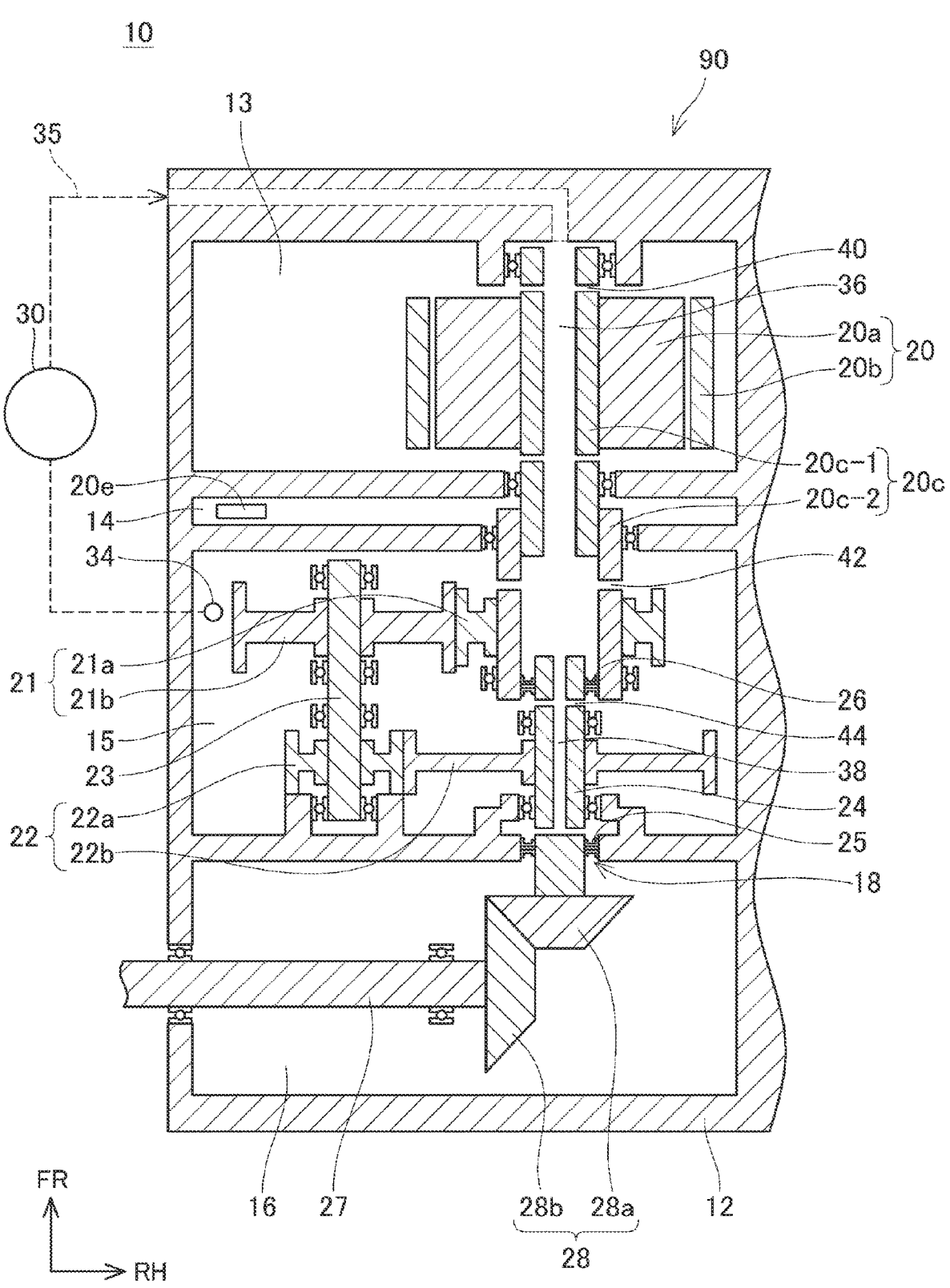

As shown in FIG. 2, the electric motor 20 has a rotor 20a and a stator 20b. The rotor 20a has a rotor shaft 20c. The rotor shaft 20c has a shaft 20c-1 and a shaft 20c-2. The shaft 20c-1 and the shaft 20c-2 each have a cylindrical shape. One end of the shaft 20c-1 is inserted into the shaft 20c-2. The shaft 20c-1 is fixed to the shaft 20c-2 by a spline-fit. The rotor 20a is accommodated in the left electric motor chamber 13 in a direction in which the rotor shaft 20c extends along the front-rear direction of electrified vehicle. The rotor shaft 20c extends through the partition wall of the case 12 from the left electric motor chamber 13 to the left counter gear chamber 15. More specifically, the shaft 20c-1 extends from the left electric motor chamber 13 to the left terminal block chamber 14, and the shaft 20c-2 extends from the left terminal block chamber 14 to the left counter gear chamber 15. The rotor 20a is rotatably supported by a bearing provided in the case 12. The stator 20b is disposed around the rotor 20a. The stator 20b is electrically connected to the terminal block 20c. When a current is supplied to the stator 20b via the terminal block 20e, the rotor 20a rotates.

A countershaft 23 and an output shaft 24 are disposed in the left counter gear chamber 15. The countershaft 23 is arranged parallel to the rotor shaft 20c. More specifically, the central axis of the countershaft 23 is parallel to the central axis of the rotor shaft 20c. The countershaft 23 is rotatably indicated by a bearing provided in the case 12. The output shaft 24 is disposed behind the rotor shaft 20c. The output shaft 24 extends coaxially with the rotor shaft 20c. More specifically, the central axis of the output shaft 24 coincides with the extension of the central axis of the rotor shaft 20c. A through-hole 18 is provided in a partition wall between the left counter gear chamber 15 and the left hypoid gear chamber 16. The output shaft 24 extends through the through-hole 18 from the left counter gear chamber 15 to the left hypoid gear chamber 16. A gap between the outer peripheral surface of the output shaft 24 and the inner peripheral surface of the through-hole 18 is scaled by an oil seal 25. The front end portion of the output shaft 24 is inserted into the center hole of the rotor shaft 20c from the rear end of the rotor shaft 20c. A gap between the inner peripheral surface of the rotor shaft 20c and the outer peripheral surface of the output shaft 24 is sealed by an oil seal 26. The output shaft 24 is rotatably indicated by a bearing provided in the case 12.

The gear set provided in the left counter gear chamber 15 has a gear 21a, 21b, 22a, 22b. The gear 21a is a cylindrical gear and is fixed to the rotor shaft 20c. The gear 21b is a cylindrical gear and is fixed to the countershaft 23. The gear 21a is engaged with the gear 21b. The first counter gear 21 is constituted by a gear 21a and a gear 21b. The gear 22a is a cylindrical gear and is fixed to the countershaft 23. The gear 22b is a cylindrical gear and is fixed to the output shaft 24. The gear 22a is engaged with the gear 22b. The second counter gear 22 is constituted by the gear 22a and the gear 22b.

When the rotor shaft 20c rotates, the gear 21a rotates, and a driving force is transmitted from the gear 21a to the gear 21b. Therefore, the gear 21b, the countershaft 23, and the gear 22a rotate. When the gear 22a rotates, a driving force is transmitted from the gear 22a to the gear 22b. Therefore, the gear 22b and the output shaft 24 rotate. The gear ratio of the first counter gear 21 is set such that the rotational speed of the countershaft 23 is slower than the rotational speed of the rotor shaft 20c. The gear ratio of the second counter gear 22 is set such that the rotation speed of the output shaft 24 is slower than the rotation speed of the countershaft 23. Thus, the output shaft 24 rotates at a lower speed than the rotor shaft 20c. As described above, the drive system in the left counter gear chamber 15 constitutes the speed reducer.

A drive shaft 27 is disposed in the left hypoid gear chamber 16. The drive shaft 27 extends along the left-right direction of electrified vehicle. The drive shaft 27 extends from the left hypoid gear chamber 16 through the left side wall of the case 12 to the outside of the case 12. As shown in FIG. 1, a left rear wheel 92 is connected to a left end portion of the drive shaft 27. The drive shaft 27 is rotatably indicated by a bearing provided in the case 12.

As shown in FIG. 2, the gear set provided in the left hypoid gear chamber 16 has a gear 28a, 28b. The gear 28a is a truncated conical gear and is fixed to the output shaft 24. The gear 28b is a truncated conical gear and is fixed to the drive shaft 27. The gear 28a is engaged with the gear 28b. The gear 28a and the gear 28b constitute a hypoid gear 28.

When the electric motor 20 is driven, the rotor shaft 20c rotates. As described above, as the rotor shaft 20c rotates, the output shaft 24 rotates. When the output shaft 24 rotates, the gear 28a rotates, and driving force is transmitted from the gear 28a to the gear 28b. Therefore, the gear 28b and the drive shaft 27 rotate. When the drive shaft 27 rotates, the left rear wheel 92 rotates. As described above, the left drive system 90 rotates the left rear wheel 92 by the driving force of the electric motor 20.

Figure 3:
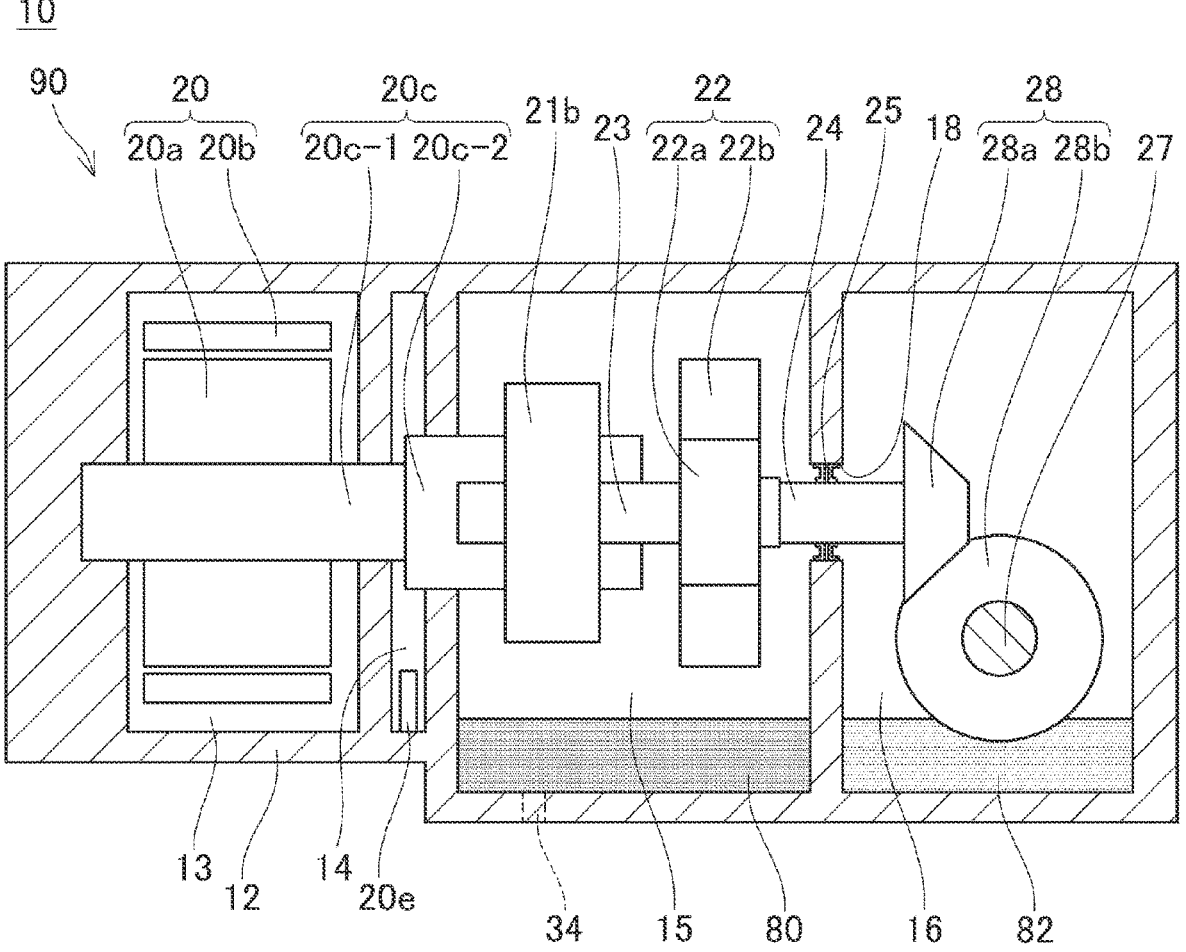
FIG. 3 is a cross-sectional view of the left drive system 90 taken along the front-rear direction.
Figure 3:

As shown in FIG. 3, the first lubricating oil 80 is stored in the bottom portion of the left counter gear chamber 15. A second lubricating oil 82 is stored in a bottom portion of the left hypoid gear chamber 16. The first lubricating oil 80 is a different type of lubricating oil from the second lubricating oil 82. The viscosity of the first lubricating oil 80 is lower than that of the second lubricating oil 82. The left counter gear chamber 15 and the left hypoid gear chamber 16 are separated by a partition wall except for the through-hole 18. The through-hole 18 is sealed by an oil seal 25. The oil seal 25 suppresses lubricating oil from leaking between the left counter gear chamber 15 and the left hypoid gear chamber 16. As described above, the left counter gear chamber 15 and the left hypoid gear chamber 16 are separated from each other so that the lubricating oil is not mixed.

The lower portion of the gear 28b is immersed in the second lubricating oil 82. Thus, as the gear 28b rotates, the hypoid gear 28 is lubricated by the second lubricating oil 82. Generally, a higher pressure is more likely to be applied to the tooth surface of the hypoid gear than the tooth surface of the counter gear (i.e., helical gear, spur gear, etc.). Therefore, the oil film is liable to be broken at the tooth surface of the hypoid gear. In the present embodiment, the pressure applied to the tooth surfaces of the hypoid gear 28 is higher than the pressure applied to the tooth surfaces of the first counter gear 21 and the second counter gear 22. However, in the present embodiment, since the hypoid gear 28 is lubricated by the second lubricating oil 82 having a high viscosity, the oil film is suppressed from being cut off on the tooth surface of the hypoid gear 28.

An oil suction port 34 is provided at the bottom of the left counter gear chamber 15. As shown in FIG. 2, the drive device 10 has an oil circulation flow path 35. An upstream end of the oil circulation flow path 35 is connected to the oil suction port 34. As described above, the rotor shaft 20c has a cylindrical configuration. The shaft flow path 36 is formed by the center hole of the rotor shaft 20c. The downstream end of the oil circulation flow path 35 is connected to the front end of the shaft flow path 36. An oil pump 30 is provided in the oil circulation flow path 35. The oil pump 30 feeds the first lubricating oil 80 in the oil circulation flow path 35 from the oil suction port 34 toward the shaft flow path 36. A plurality of oil discharge ports 40 extending from the shaft flow path 36 to the outer peripheral surface of the rotor shaft 20c are provided in the rotor shaft 20c (i.e., the shaft 20c-1) in the left electric motor chamber 13. A plurality of oil discharge ports 42 extending from the shaft flow path 36 to the outer peripheral surface of the rotor shaft 20c are provided in the rotor shaft 20c (i.e., the shaft 20c-2) in the left counter gear chamber 15. A shaft flow path 38 extending along the central axis thereof is provided inside the output shaft 24. A front end of the shaft flow path 38 is connected to the shaft flow path 36. The output shaft 24 is provided with a plurality of oil discharge ports 44 extending from the shaft flow path 38 to the outer peripheral surface of the output shaft 24.

During operation of the electric motor 20, the oil pump 30 operates. When the oil pump 30 is operated, the first lubricating oil 80 stored in the left counter gear chamber 15 is supplied to the shaft flow path 36 in the rotor shaft 20c via the oil suction port 34 and the oil circulation flow path 35. The first lubricating oil flows rearward through the shaft flow path 36. The electric motor 20 is cooled by the first lubricating oil flowing in the shaft flow path 36. A portion of the first lubricating oil in the shaft flow path 36 is discharged from the oil discharge ports 40 into the left electric motor chamber 13. The electric motor 20 is lubricated by the first lubricating oil discharged into the left electric motor chamber 13. The first lubricating oil discharged into the left electric motor chamber 13 flows through an oil flow path (not shown) and the left terminal block chamber 14 to the left counter gear chamber 15. A portion of the first lubricating oil in the shaft flow path 36 is discharged from the oil discharge ports 42 into the left counter gear chamber 15. The first counter gear 21 is lubricated and cooled by the first lubricating oil discharged from the oil discharge ports 42. The first lubricating oil flowing to the rear end in the shaft flow path 36 flows into the shaft flow path 38 in the output shaft 24. The first lubricating oil in the shaft flow path 38 is discharged from the oil discharge ports 44 into the left counter gear chamber 15. The second counter gear 22 is lubricated and cooled by the first lubricating oil discharged from the oil discharge ports 44.

As described above, the first lubricating oil circulates between the left electric motor chamber 13 and the left counter gear chamber 15, so that the electric motor 20, the first counter gear 21, and the second counter gear 22 are cooled and lubricated. Since the pressure applied to the tooth surfaces of the first counter gear 21 and the second counter gear 22 is low, it is possible to suppress the oil film from being broken at the tooth surfaces of the first counter gear 21 and the second counter gear 22 even if the clay of the first lubricating oil is low. In addition, since the clay of the first lubricant is low, the rotor 20a, the first counter gear 21, and the second counter gear 22 can rotate at low loss. Further, since the clay of the first lubricating oil is low, the first lubricating oil can be efficiently circulated by the oil pump 30. As described above, by using the first lubricating oil having a low clay for the electric motor 20 and the counter gear, loss is suppressed.

In the above-described embodiment, the first counter gear 21 and the second counter gear 22 are provided in the left counter gear chamber 15. However, a pair of counter gears may be provided in the left counter gear chamber 15. In this case, the countershaft may be arranged so as to extend from the left counter gear chamber 15 to the left hypoid gear chamber 16, and each shaft and each gear may be arranged so that a driving force is transmitted from the countershaft to the drive shaft via the hypoid gear.

In the above-described embodiment, the left counter gear chamber 15 functions as a storage tank for storing the first lubricating oil. However, a storage tank for storing the first lubricating oil may be provided separately from the left counter gear chamber 15. In this case, the left counter gear chamber 15 may not store the first lubricating oil.

Although the embodiments have been described in detail above, the embodiments are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or the drawings achieve a plurality of objectives at the same time, and achieving one of the objectives itself has technical usefulness.

What is claimed is:

1. A drive device mounted on a vehicle, the drive device comprising:
   a case including an electric motor chamber, a counter gear chamber, and a hypoid gear chamber, the counter gear chamber and the hypoid gear chamber being separated by a partition wall, and the partition wall having a through-hole;
   an electric motor housed in the electric motor chamber;
   a first shaft that is disposed parallel to or coaxial with a rotor shaft of the electric motor and extends from the counter gear chamber to the hypoid gear chamber;
   a counter gear that is housed in the counter gear chamber and transmits rotation of the rotor shaft to the first shaft;
   a second shaft that extends from the hypoid gear chamber to an outside of the case and rotates a wheel of the vehicle;
   a hypoid gear that is housed in the hypoid gear chamber and transmits rotation of the first shaft to the second shaft;
   an oil seal that seals a gap between an outer peripheral surface of the first shaft and an inner peripheral surface of the through-hole;
   a first lubricating oil stored in the electric motor chamber and the counter gear chamber; and
   a second lubricating oil stored in the hypoid gear chamber.

2. The drive device according to claim 1, wherein a viscosity of the first lubricating oil is lower than a viscosity of the second lubricating oil.

3. The drive device according to claim 1, further comprising an oil pump that circulates the first lubricating oil between the electric motor chamber and the counter gear chamber.

4. The drive device according to claim 1, wherein:
   the rotor shaft has cylindrical configuration;
   the rotor shaft includes a first shaft flow path extending along a central axis of the rotor shaft in longitudinal direction; and
   the first shaft flow path includes a plurality of first oil discharge ports extending from the first shaft flow path to an outer peripheral surface of the rotor shaft, the plurality of first oil discharge ports being connected to the electric motor chamber and the counter gear chamber.

5. The drive device according to claim 1, wherein:
   the first shaft has cylindrical configuration;
   the first shaft includes a second shaft flow path extending along a central axis of the first shaft in longitudinal direction; and the second shaft flow path includes a second oil discharge port extending from the second shaft flow path to an outer peripheral surface of the first shaft and connected to the counter gear chamber.

6. The drive device according to claim 1, wherein:

the rotor shaft and the first shaft have cylindrical configuration;

the rotor shaft includes a first shaft flow path extending along a central axis of the rotor shaft in longitudinal direction;

the first shaft flow path includes a plurality of first oil discharge ports extending from the first shaft flow path to an outer peripheral surface of the rotor shaft and connected to the electric motor chamber and the counter gear chamber;

the first shaft includes a second shaft flow path extending along a central axis of the first shaft in longitudinal direction; and the second shaft flow path includes a second oil discharge port extending from the second shaft flow path to an outer peripheral surface of the first shaft and connected to the counter gear chamber.

\* \* \* \* \*